United States Patent
Chen et al.

(10) Patent No.: US 7,650,084 B2
(45) Date of Patent: Jan. 19, 2010

(54) OPTICAL HETERODYNE RECEIVER AND METHOD OF EXTRACTING DATA FROM A PHASE-MODULATED INPUT OPTICAL SIGNAL

(75) Inventors: Young-Kai Chen, Berkeley Heights, NJ (US); Ut-Va Koc, Bridgewater, NJ (US); Andreas Leven, Gillette, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 637 days.

(21) Appl. No.: 11/236,246

(22) Filed: Sep. 27, 2005

(65) Prior Publication Data

US 2007/0071456 A1    Mar. 29, 2007

(51) Int. Cl.
*H04B 10/06* (2006.01)
(52) U.S. Cl. ...................... 398/206; 398/204
(58) Field of Classification Search ............... 398/204, 398/206
See application file for complete search history.

(56) References Cited

U.S. PATENT DOCUMENTS

| | | | | |
|---|---|---|---|---|
| 4,470,147 | A * | 9/1984 | Goatcher | 375/321 |
| 4,583,239 | A * | 4/1986 | Vance | 375/324 |
| 4,667,203 | A * | 5/1987 | Counselman, III | 342/357.06 |
| 5,115,332 | A * | 5/1992 | Naito et al. | 398/202 |
| 6,317,589 | B1 * | 11/2001 | Nash | 455/245.2 |
| 2002/0145787 | A1 * | 10/2002 | Shpantzer et al. | 359/136 |
| 2004/0096143 | A1 * | 5/2004 | Shpantzer et al. | 385/16 |
| 2004/0160661 | A1 * | 8/2004 | Hurrell et al. | 359/325 |
| 2006/0105732 | A1 * | 5/2006 | Fujii | 455/302 |

FOREIGN PATENT DOCUMENTS

| | | | |
|---|---|---|---|
| JP | 06053906 | A * | 2/1994 |
| WO | WO 9607251 | A2 * | 3/1996 |

OTHER PUBLICATIONS

Ahmed, Y. "A Model-Based Approach to Demodulation of Co-Channel MSK Signals". Thesis. Virginia Polytechnic Institute and State University, Dec. 2002.*
"Application Note 1870: Demystifying Sigma-Delta ADCs". Maxim Integrated Products. Jan. 31, 2003. viewed on Aug. 15, 2008 <http://www.maxim-ic.com/an1870>.*
Sklar, B. Digital Communications: Fundamentals and Applications. 2nd ed. Upper Saddle River, NJ: Prentice Hall PTR, 2001.*

* cited by examiner

*Primary Examiner*—Leslie Pascal
(74) *Attorney, Agent, or Firm*—Hitt Gaines, PC

(57) ABSTRACT

An optical heterodyne receiver and a method of extracting data from a phase-modulated input optical signal. In one embodiment, the optical heterodyne receiver includes: (1) a photonic quadrature demodulator having first and second optical inputs and first and second electrical outputs and configured to generate at the first and second electrical outputs an in-phase signal and a quadrature-phase signal, respectively, in response to receiving a modulated optical signal at the first optical input and a reference optical oscillator signal at the second optical input, (2) a passive radio frequency single sideband demodulator coupled to the photonic quadrature demodulator and configured to extract at least one sideband of the in-phase signal or the quadrature-phase signal and (3) at least one analog-to-digital converter coupled to the passive radio frequency single sideband demodulator and configured to receive and sample the at least one sideband.

20 Claims, 6 Drawing Sheets

OPTICAL HETERODYNE RECEIVER AND METHOD OF EXTRACTING DATA FROM A PHASE-MODULATED INPUT OPTICAL SIGNAL

TECHNICAL FIELD OF THE INVENTION

The present invention is directed, in general, to optical receivers and, more specifically, to an optical heterodyne receiver and a method of extracting data from a phase-modulated input optical signal.

BACKGROUND OF THE INVENTION

Optical transmission systems, which use coherent (laser) light and optical fibers to send data, often employ phase modulation to encode data in an optical carrier wave.

The phase-modulated light must eventually be received and demodulated by an optical receiver to yield electrical signals. It is vital that the receiver be capable of receiving, demodulating and decoding the data contained in the optical signal as quickly as it is received.

Some traditional phase demodulation techniques rely on a phase discriminator (typically a simple delay-line filter), an envelope detector and an integrator. Unfortunately, phase discriminators exhibit nonlinearities, which limit their dynamic range. Other phase demodulation techniques rely on fast phase tracking. Unfortunately, phase tracking works well for rather small signal bandwidths and low carrier frequencies.

The wide-band rectifier narrowband amplifier (WIRNA) receiver architecture, which originally was developed for amplitude modulation (AM) - coherent systems, has been successfully demonstrated in a coherent phase-modulated link. WIRNA uses a nonlinear device to mix beat tone and a sideband to a lower frequency to cancel out laser phase noise. Unfortunately, this non-linear process exhibits intermodulation distortion (IMD) at high carrier frequencies. Furthermore, the nonlinear device has to operate at two to three times the operating frequency of the link. Therefore, the WIRNA architecture cannot be used for a receiver required to operate with respect to a wide range of center carrier frequencies.

All of the above-described techniques require bandwidths that are several multiples of the incoming signal bandwidth to recover data reliably. Unfortunately, the bandwidth that is required of the receiver becomes immense. Traditional phase demodulation techniques become essentially unworkable.

Accordingly, it may be desirable to have a fundamentally new optical receiver topology that does not require a bandwidth that is several times that of the incoming optical signal. It may also be desirable to have a better way to receive and demodulate optical signals.

SUMMARY OF THE INVENTION

To address the above-discussed deficiencies of the prior art, the present invention provides, in one aspect, an optical heterodyne receiver. In one embodiment, the optical heterodyne receiver includes: a photonic quadrature demodulator having first and second optical inputs and first and second electrical outputs and configured to generate at the first and second electrical outputs an in-phase signal and a quadrature-phase signal, respectively, in response to receiving a modulated optical signal at the first optical input and a reference optical oscillator signal at the second optical input, a passive radio frequency single sideband demodulator coupled to the photonic quadrature demodulator and configured to extract at least one sideband of the in-phase signal or the quadrature-phase signal and at least one analog-to-digital converter coupled to the passive radio frequency single sideband demodulator and configured to receive and sample the at least one sideband.

In another aspect, the present invention provides a method of extracting data from a phase-modulated input optical signal. In one embodiment, the method includes: generating at first and second electrical outputs of a photonic quadrature demodulator having first and second optical inputs an in-phase signal and a quadrature-phase signal, respectively, in response to receiving the phase-modulated input optical signal at the first optical input and a reference optical oscillator signal at the second optical input, separating out at least one sideband of the in-phase signal or the quadrature-phase signal and receiving and sampling the at least one sideband, respectively, with at least one analog-to-digital converter.

In yet another aspect, the present invention provides an optical heterodyne receiver. In one embodiment, the optical heterodyne receiver includes: a photonic quadrature demodulator having first and second optical inputs and first and second electrical outputs and configured to generate at the first and second electrical outputs an in-phase signal and a quadrature-phase signal, respectively, in response to receiving a modulated optical signal at the first optical input and a reference optical oscillator signal at the second optical input, a passive radio-frequency single-sideband demodulator coupled to the photonic quadrature demodulator, configured to extract sidebands of the in-phase signal and a quadrature-phase signal, respectively and a base band processor coupled to the passive radio-frequency single-sideband demodulator, containing first and second sigma-delta analog-to-digital converters configured to receive and sample the sidebands, and configured to execute a Model-Based Phase Demodulation (MBPD) process (as that term is hereinafter defined) with respect to the sidebands.

The foregoing has outlined preferred and alternative features of embodiments so that those skilled in the art may better understand the detailed description that follows. Those skilled in the art should appreciate that the disclosed specific embodiments form a basis for designing or modifying other structures and methods for carrying out the same purposes of the present invention. Those skilled in the art should also realize that such equivalent constructions do not depart from the spirit and scope of the present invention.

BRIEF DESCRIPTION OF THE DRAWINGS

For a more complete understanding of the invention, reference is now made to the following descriptions taken in conjunction with the accompanying drawing, in which.

DETAILED DESCRIPTION

The optical heterodyne receiver 100 introduces novel features to circumvent the limitations in the aforementioned traditional approaches. First, the optical heterodyne receiver 100 uses a fixed, low, intermediate frequency (IF) frequency band for signal detection. In particular, a coherent heterodyne receiver is used with the local oscillator laser offset by the microwave carrier frequency to align the first side-lobe of the phase modulated optical signal to the local oscillator laser within a predefined IF frequency band, e.g., around 500 MHz. In the illustrated embodiment, only this frequency band is used for data recovery. Second, the optical heterodyne receiver 100 implements a novel signal-processing-based approach to demodulate the transmitted signal in which the signal bandwidth falls within the bandwidth of base band analog-to-digital converters (ADCs) or passband of sigma-delta ADCs. Only the nonlinearity of the photodetector limits the IMD, because of the near-ideal characteristics of the DSP-based demodulator.

Figure 1:
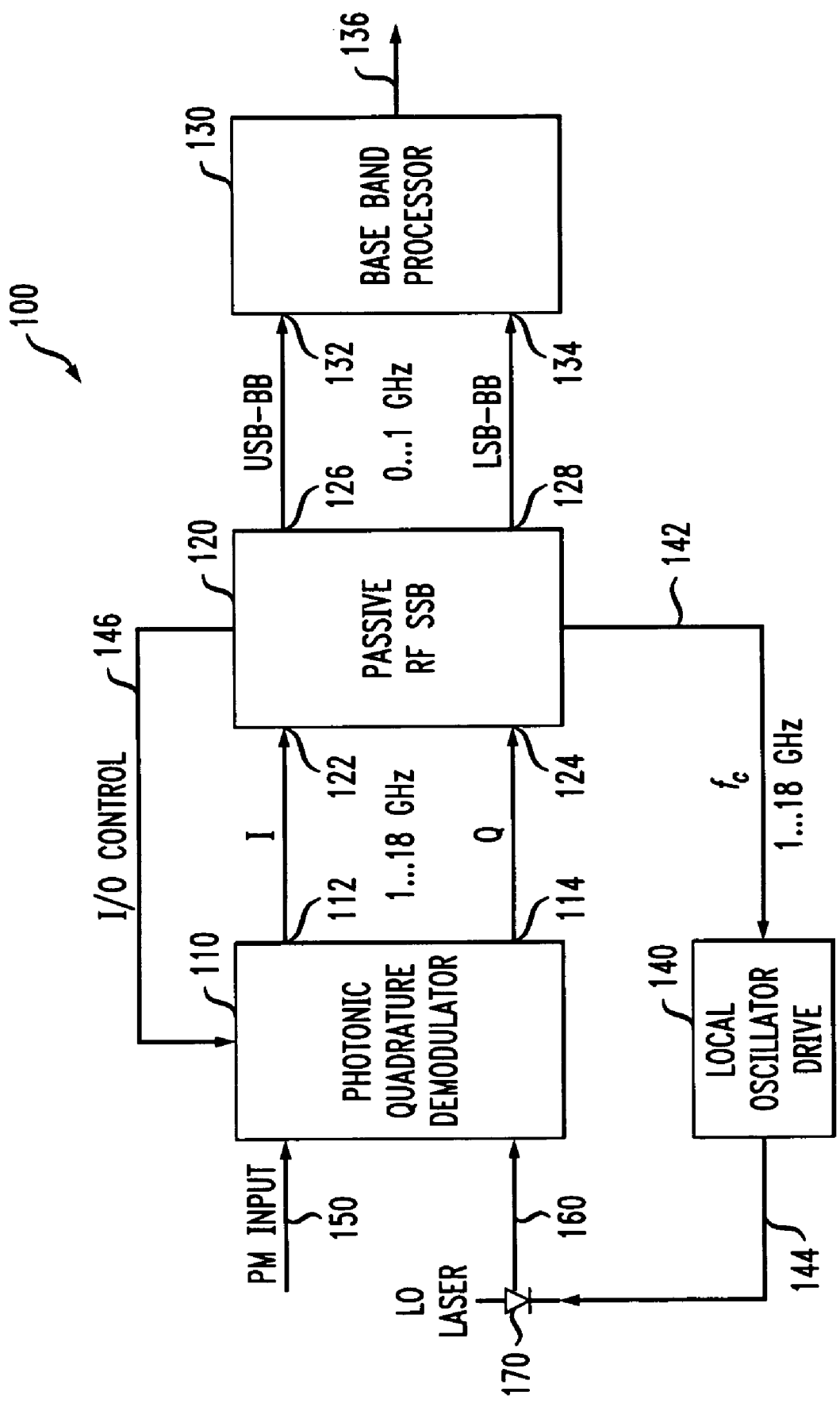
FIG. 1 illustrates a functional block diagram of an optical heterodyne receiver constructed according to the principles of the present invention.

Referring initially to FIG. 1, illustrated is a functional block diagram of an optical heterodyne receiver 100 constructed according to the principles of the present invention. The exemplary optical heterodyne receiver 100 has four basic functional blocks: a photonic quadrature demodulator 110, a passive radio-frequency (RF) single sideband (SSB) demodulator 120, a base band processor 130 and a local oscillator drive 140.

The illustrated embodiment of the photonic quadrature demodulator 110 is a coherent demodulator configured to combine a phase-modulated input optical signal with the output of a local oscillator laser and generate photocurrents for in-phase (I) and quadrature (Q) components thereof. The photonic quadrature demodulator 110 has first and second optical inputs 150, 160. The first optical input 150 is a phase-modulated signal input configured to receive the phase-modulated input optical signal, typically from an optical fiber (not shown). In the illustrated embodiment, the phase-modulated input optical signal is a linear phase-modulated microwave signal. The second optical input 160 is a local oscillator laser input connected to receive the output of a local oscillator laser 170.

The photonic quadrature demodulator 110 further has first and second electrical outputs 112, 114. The first electrical output 112 is configured to provide an electrical signal representing the I component of the demodulated input optical signal. The second electrical output 114 is configured to provide an electrical signal representing the Q component of the demodulated input optical signal. As FIG. 1 indicates, the I and Q electrical signals lie in the frequency range of 1-18 GHz. Those skilled in the art should understand, however, that the present invention is in no way restricted to this range.

In one embodiment of the present invention, the photonic quadrature demodulator 110 takes the form of a photonic integrated circuit (PIC). Those skilled in the art are familiar with the advantages to be found in PICs, but also should understand that the present invention is not limited to PIC-based photonic quadrature demodulators.

The internal structure of one embodiment of the photonic quadrature demodulator 110 will be described in greater detail in conjunction with FIG. 2.

The illustrated embodiment of the passive RF SSB demodulator 120 is configured to separate the beat tone of the input optical signal and the local oscillator laser 170 output from an intermediate frequency (IF) signal. The beat tone is used in a first feedback loop (described more fully below) to keep the local oscillator laser 170 locked at a certain offset frequency relative to the input optical signal. The IF signal is limited substantially to the first-order sidebands of the phase-modulated signal.

The passive RF SSB demodulator 120 has first and second electrical inputs 122, 124. The first electrical input 122 is connected to receive the I electrical signal from the photonic quadrature demodulator 110. The second electrical input 124 is connected to receive the Q electrical signal from the photonic quadrature demodulator 110.

The passive RF SSB demodulator 120 further has first and second electrical outputs 126, 128. The first electrical output 126 is configured to provide an electrical signal representing the first-order upper sideband (USB) of the demodulated I and Q components. For this reason, this electrical signal is designated "USB." The second electrical output 128 is configured to provide an electrical signal representing the first-order lower sideband (LSB) of the demodulated I and Q components. For this reason, this electrical signal is designated "LSB."

The internal structure of one embodiment of the passive RF SSB demodulator 120 will be described in greater detail in conjunction with FIG. 2.

The illustrated embodiment of the base band processor 130 is configured to employ a novel signal processing algorithm to reconstruct the originally transmitted signal from USB and LSB. The base band processor 130 has first and second electrical inputs 132, 134. The first electrical input 132 is configured to receive USB. The second electrical input 134 is configured to receive LSB. As FIG. 1 indicates, USB and LSB have frequencies that lie in the range of 0-1 GHz. Those skilled in the art should recognize that this bandwidth is significantly below that of the I and Q electrical signals. As a result, the base band processor 130 need only be equipped to handle frequencies of about 0-1 GHz, and not a larger bandwidths. Those skilled in the art should understand, however, that the present invention is in no way restricted to the 0-1 GHz range.

The base band processor 130 has an output 136 configured to produce a signal representing the data carried on the input optical signal. In the illustrated embodiment, the output 136 takes the form of a data bus with plural data lines. The internal structure of one embodiment of the base band processor 130 will be described in greater detail in conjunction with FIG. 2.

In the illustrated embodiment, two feedback loops are used to control the operation of the optical heterodyne receiver 100, and more specifically the photonic quadrature demodulator 110. The first feedback loop employs the local oscillator drive 140. The passive RF SSB demodulator 120 produces an output signal, on an output 142, indicating $f_c$, which is the frequency spacing between the transmit laser (not shown) and the local oscillator laser 170. From $f_c$, the local oscillator drive 140 produces a drive signal, on an output 144, that drives the local oscillator laser 170. In response, the local oscillator laser 170 provides its light to the second optical input 160 of the photonic quadrature demodulator 110. The internal structure of one embodiment of the local oscillator drive 140 will be described in greater detail in conjunction with FIG. 2.

For the second feedback loop, the passive RF SSB demodulator 120 produces a control signal ("I/Q CONTROL") that is used to provide a phase offset to the output of the local oscillator laser 170 (provided via the second optical input 160). This allows the local oscillator laser 170 to provide both I and Q local oscillator signals within the photonic quadrature demodulator 110.

Having described the various functional blocks of an exemplary optical heterodyne receiver 100, exemplary internal structures of the various blocks will now be described. Accordingly, turning now to FIG. 2, illustrated is a schematic diagram of one embodiment of the optical heterodyne receiver 100 of FIG. 1.

The photonic quadrature demodulator 110 is illustrated as containing first, second, third and fourth multimode interferors (MMIs) 211, 212, 214, 215 and a phase modulator (PM) 213 optically coupled as shown by optical waveguides (not separately referenced). The photonic quadrature demodulator 110 also contains first and second matched, balanced photodetector pairs 216, 217. Matched, balanced photodetector pairs are preferred, because they are effective in suppressing common-mode noises from the local oscillator laser 170. However, other detector architectures fall within the broad scope of the present invention.

The linearity of the photodetectors in the photodetector pairs 216, 217 plays a substantial role in determining the spurious free dynamic range (SFDR) of the optical heterodyne receiver 100 of FIG. 1. For example, photodetectors that are linear up to more than 100 milliwatt (mW) yield an SFDR of at least about 175 dBc/Hz. In addition, to increase SPDF, the local oscillator laser 170 should exhibit low relative intensity noise (RIN). For example, in the illustrated embodiment, the local oscillator laser 170 has a RIN of about −160 dBc/Hz.

The first MMI 211 is configured to receive the phase-modulated input optical signal via the first optical input 150. The second MMI 212 is configured to receive the output of the local oscillator laser via the second optical input 160. The PM 213 phase-adjusts the reference signal to yield an I optical reference signal from a Q optical reference signal.

The first photodetector pair 216 is evanescent-coupled to the optical waveguides leading from the third MMI 214 and is configured to provide the I electrical signal. (Those skilled in the pertinent art understand that evanescent coupling is achieved by placing the input of one optical element within the optical evanescent field of the output of another optical element; evanescent coupling effects a transfer of light energy from the output to the input but obviates the need for mechanical contact between the optical elements.) Likewise, the second photodetector pair 217 is evanescent-coupled to the optical waveguides leading from the fourth MMI 215 and is configured to provide the Q electrical signal. Those skilled in the art are familiar with the construction and use of MMIs, PMs and photodetector pairs of the type that may be used within the photonic quadrature demodulator 110.

The illustrated embodiment of the photonic quadrature demodulator 110 is a photonic integrated circuit (PIC) having a high power capability. More specifically, the photonic quadrature demodulator 110 is capable of handling an optical power in excess of 100 milliwatts (mW). To be able to handle such high power, the peak power density is advantageously reduced in the illustrated embodiment by using diluted (multilayer) optical waveguides.

An RF SSB demodulator 221 within the passive RF SSB demodulator 220 receives the I and Q electrical signals from the first and second photodetector pairs 216, 217. In turn, the RF SSB demodulator 221 produces two electrical signals: a first electrical signal representing an upper sideband (USB) and a second electrical signal representing a lower sideband (LSB).

A first diplexer 222 receives the first electrical signal representing the USB and divides it into two portions based on frequency. A low-pass filter (not shown) causes a lower 1 GHz portion representing the USB to be provided to the base band processor 130. A high-pass filter (not shown) causes the remaining upper portion (e.g., 1-18 GHz) to be provided to an I/Q control unit 224, which produces the above-described I/Q CONTROL control signal that is used to provide the 90° I/Q phase offset for the output of the local oscillator laser 170 (provided via the second optical input 160). This allows the local oscillator laser 170 to provide both I and Q local oscillator signals within the photonic quadrature demodulator 110.

A second diplexer 223 receives the second electrical signal representing the LSB and divides it into two portions, again based on frequency. As above, a low-pass filter (not shown) causes a lower 1 GHz portion representing the LSB to be provided to the base band processor 130. Further, a high-pass filter (not shown) causes the remaining upper portion (e.g., 1-18 GHz) to be provided to the local oscillator drive 140 for use in driving the local oscillator laser 170.

Those skilled in the art are familiar with the construction and use of SSB demodulators and diplexers of the type that may be used within the passive RF SSB demodulator 120.

The illustrated embodiment of the base band processor 130 includes first and second high-resolution analog-to-digital converters (ADCs) 231, 232 and a digital signal processor (DSP) 233. In the illustrated embodiment, the first and second ADCs 231, 232 are sigma-delta (ΣΔ) ADCs. The first ΣΔ ADC 231 is coupled to the first diplexer 222 and is configured to receive the electrical signal, or photocurrent, representing the USB that the first diplexer 222 provides. The first ΣΔ ADC 231 samples the electrical signal, yielding a stream of digital samples. In like manner, the second ΣΔ ADC 232 is coupled to the second diplexer 223 and is configured to receive the electrical signal, or photocurrent, representing the LSB that the second diplexer 223 provides. Like the first ΣΔ ADC 231, the second ΣΔ ADC 232 samples the electrical signal, yielding a stream of digital samples. The streams of digital samples emanating from the first and second ΣΔ ADCs 231, 232 are provided to the DSP 233, which employs a novel signal processing process to demodulate and extract the data contained in the samples. One embodiment of the novel signal processing process will be described below. The data exit the DSP 233 and the base band processor 130 as a whole via the output bus 136. Those skilled in the art are familiar with the construction and use of ΣΔ ADCs and DSPs of the type that may be used within the base band processor 130.

The local oscillator drive 140 is configured to cause the local oscillator laser 170 to maintain a phase that tracks the phase of the modulated optical carrier received at the input 150. In particular, the local oscillator drive 140 causes the local oscillator laser to introduce an optical signal with a 90° phase-offset relative to the phase-modulated input optical signal at the inputs of the MMI 215. In particular, the illustrated embodiment of the local oscillator drive 140 takes the form of a high-speed, electronic, digital phase-locking loop (PLL) application-specific integrated circuit (ASIC). However, those skilled in the pertinent art will understand that the local oscillator drive 140 may be embodied in alternative circuits without departing from the principles of the present invention.

The local oscillator drive 140 is illustrated as including a divide-by-N circuit 251 that divides the upper portion (e.g., 1-18 GHz) of the second electrical signal provided from the diplexer 223 by a programmable constant. A local clock signal from a local clock 252 provides a stable reference frequency at the divided-down carrier frequency, typically 10 MHz or 100 MHz. The carrier frequency is the upper portion (e.g., 1-18 GHz) of the second electrical signal which is approximately the difference frequency of the local oscillator laser 170 and transmit laser. The local clock signal is mixed with the reciprocal signal in a mixer 253 and provided to a low-pass filter 254. The low-pass filter 254 substantially attenuates the higher frequency product of the mixer 253 and provides the lower frequency product of the mixer 253 as a drive signal for the local oscillator laser 170.

Figure 2:
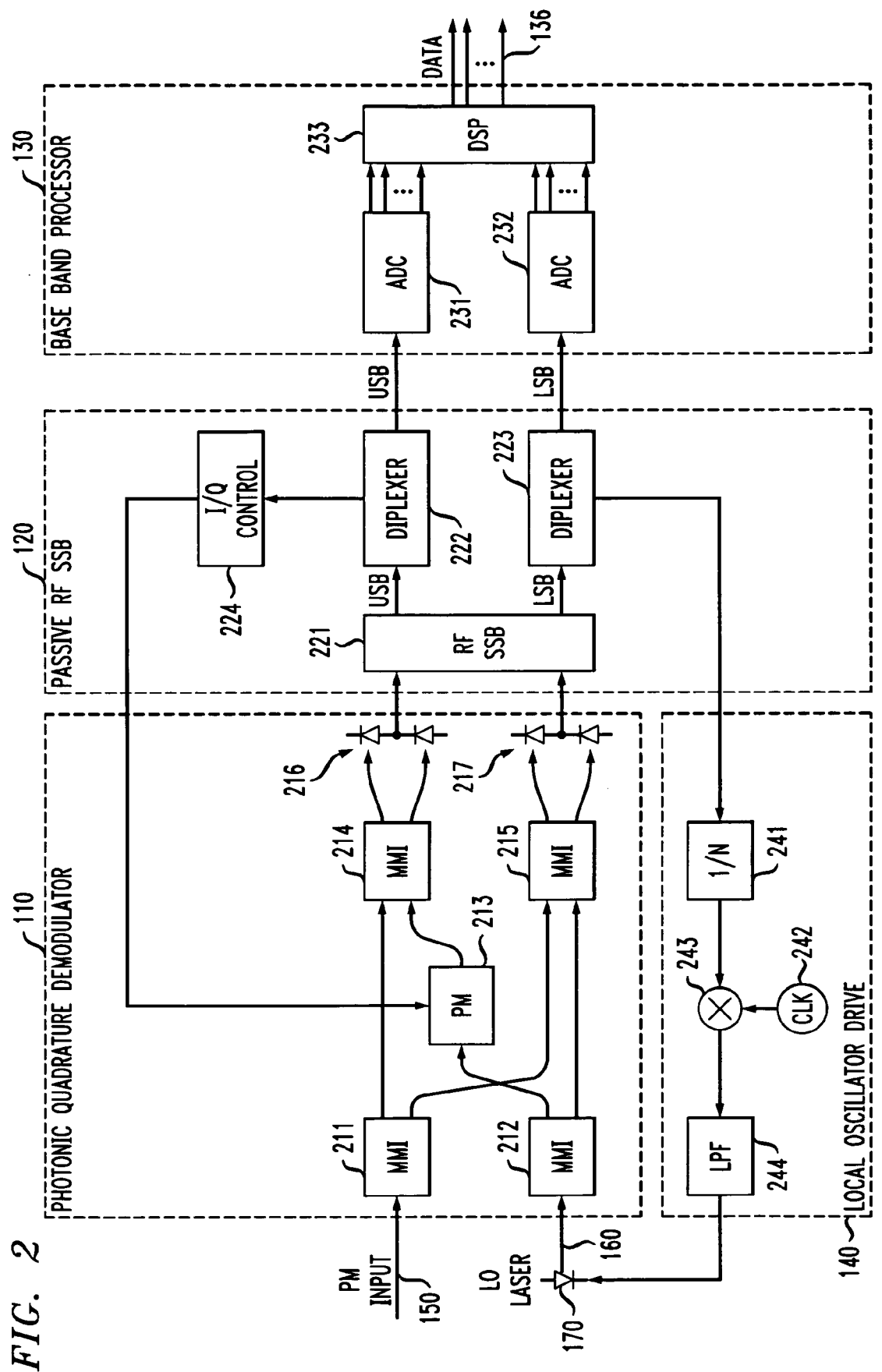
FIG. 2 illustrates a schematic diagram of one embodiment of the optical heterodyne receiver of FIG. 1.
Figure 3:
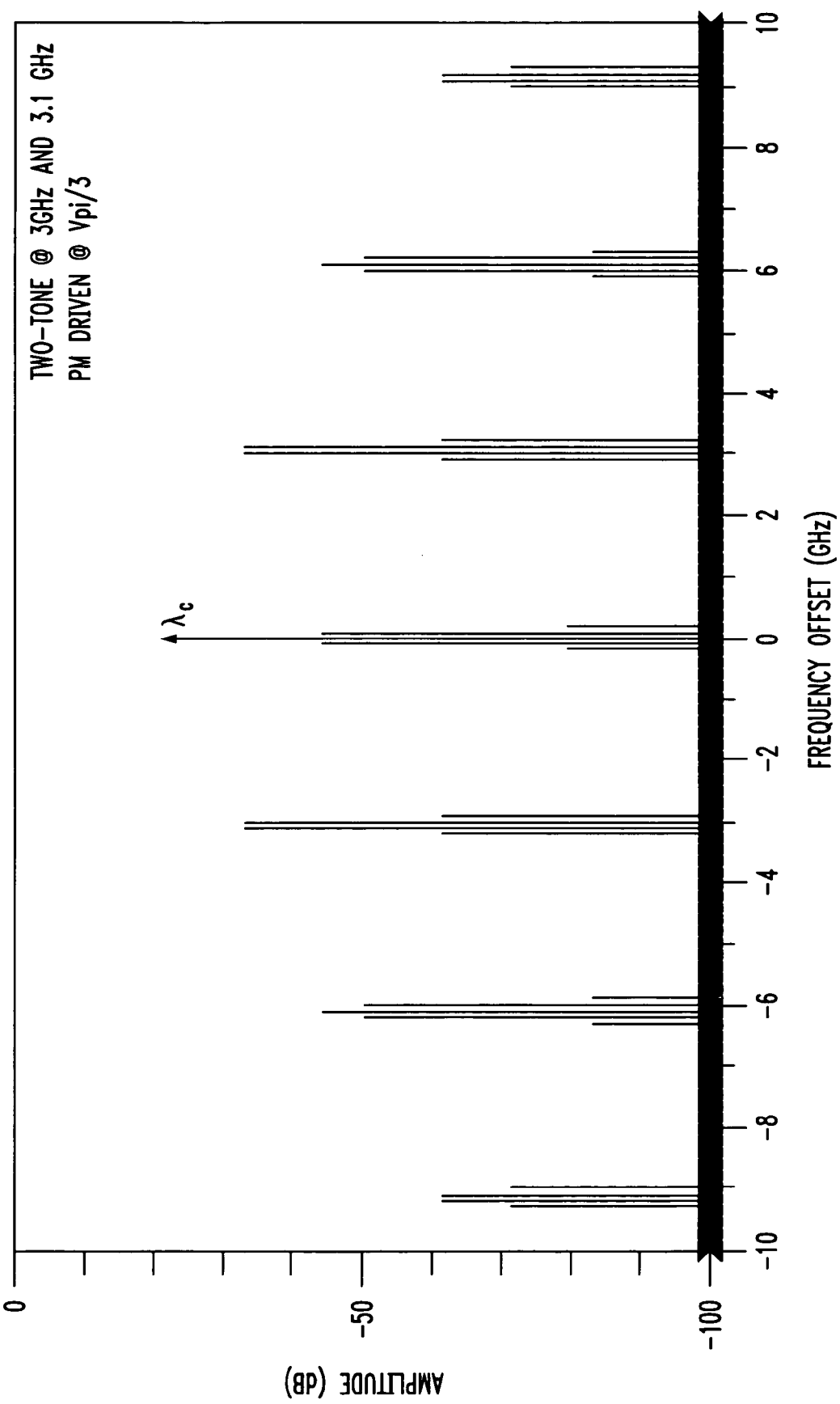
FIG. 3 illustrates a graphical representation of the frequency-domain spectrum of a two-tone, phase-modulated optical signal suitable for reception by the optical heterodyne receiver of FIGS. 1 or 2.

Turning briefly to FIG. 3, illustrated is a graphical representation of the frequency-domain spectrum of a two-tone, phase-modulated optical signal suitable for reception by the optical heterodyne receiver of FIGS. 1 or 2. This is the nature of the optical signal that is to be received and demodulated. In particular, the signal includes multiple upper sidebands and multiple lower sidebands around the center or carrier frequency.

The novel process by which the data contained in the samples is demodulated and extracted will henceforth be called "Model-Based Phase Demodulation," or MBPD. It is desirable to recover the signal provided to the optical heterodyne receiver 100 of FIG. 1 with minimal distortion. As described above, traditional PM receivers, which use frequency discriminators or PLL-based approaches, require knowledge of multiple sidebands to restore the original signal. The large range of the signal frequency of 1 to 18 GHz makes any of the traditional PM demodulation approaches a very challenging task. MBPD, in stark contrast, requires only knowledge of one pair of sidebands, typically the lowest-order pair.

Figure 4:
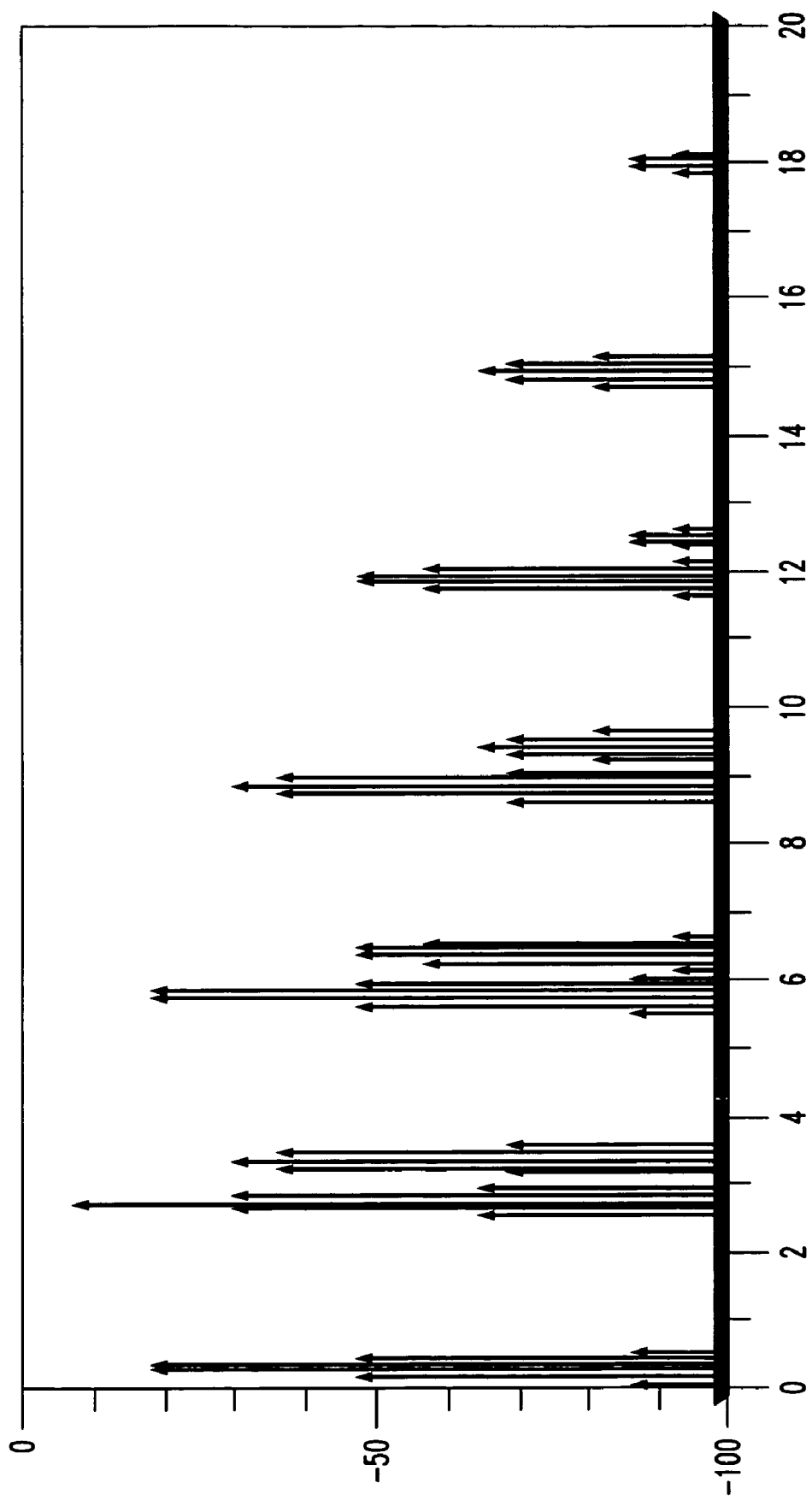
FIG. 4 illustrates a graphical representation of the frequency-domain spectrum of the photocurrent of the two-tone, phase-modulated optical signal of FIG. 3 before single-sideband extraction.

Turning now to FIG. 4, illustrated is a graphical representation of the frequency-domain spectrum of the photocurrent of the two-tone, phase-modulated optical signal of FIG. 3 before single-sideband extraction. FIG. 4 shows a simulated spectrum of the photocurrent for a two-tone transmitted signal (RF: 3.0 GHz and 3.1 GHz, local oscillator 2.75 GHz). As can be seen, even for this rather low RF frequency, a traditional demodulator has to process a large bandwidth to demodulate the signal without significant distortion. Using MBPD, only one sideband (e.g., the lowest offset sideband in FIG. 4 with all signals below 0.5 GHz) is used for demodulation. The original signal is then reconstructed using a model of the phase modulation.

The received photocurrent can be expressed as $i(t)=2P_s \cos(\Delta\omega t - \beta x(t) + \theta_s)$ with $P_s$ representing the power of the transmit and local oscillator lasers, $\Delta\omega$ representing the difference frequency of the transmit and local oscillator lasers, $\beta$ representing the phase modulation index and $\Delta\omega$ representing an arbitrary phase offset. The channel model includes this ideal phase modulation function, followed by low-pass filtering. The channel model is the mathematical expression for the phase modulation process. The word "ideal" indicates that a calibration stage is used to match the phase modulated signal by the device with the signal predicated by the model to include non-ideal parameters. This calibrated channel model is then used in the optimization process/algorithm described below to extract x(t).

After reception, the photocurrent is sampled in the time domain; the $n^{th}$ time sample is described as $z_n$. x(t) describes the original to be reconstructed signal at time t. Since x(t) contains certain known spectral and temporal characteristics such as bandwidth limits and bounded temporal values, the complete signal space, $\Omega$, of the targeted signal x(t) can be represented on an orthogonal basis. For each possible signal element in $\Omega$, expected digitized data samples, $\hat{z}_n$, can be calculated based on the optical phase modulation model with known parameters. The cost function $$e = \sum_n (\hat{z}_n - z_n)^2$$

can be computed from a group of digitized data samples $z_n$. Through any appropriate, conventional optimization technique, the cost function, e, is minimized to select the optimal reconstructed signal, $$\hat{x} = \underset{\Omega}{\mathrm{argmin}}\{e\} = \underset{\Omega}{\mathrm{argmin}}\left\{\sum_n (\hat{z}_n - z_n)^2\right\}.$$

A stream of $z_n$, $\{z_n; n=1, \ldots, N\}$, produces a stream of $\hat{x}_k$, $\{\hat{x}_k; k=1, \ldots, M\}$. The single value of e is obtained for optimization. Uniform weighting is assumed in the cost function set forth above. A non-uniform weighting can also be used, e.g.:

$$\hat{x} = \underset{\Omega}{\mathrm{argmin}}\{e\} = \underset{\Omega}{\mathrm{argmin}}\left\{\sum_n W_n(\hat{z}_n - z_n)^2\right\}.$$

Figure 5A:
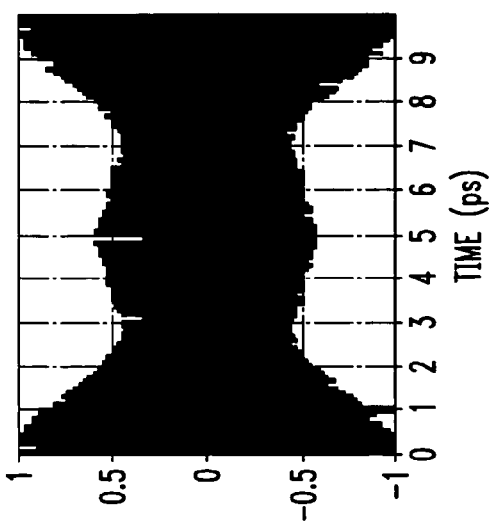
FIGS. 5A-5F together illustrate frequency- and time-domain representations pertaining to a simulation of an MDPD process for an arbitrary signal centered at about 10 GHz with an instantaneous bandwidth of about 500 MHz.
Figure 5B:
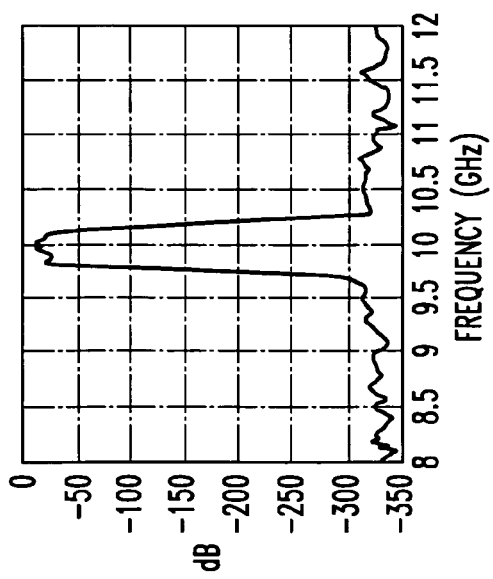
Figure 5C:
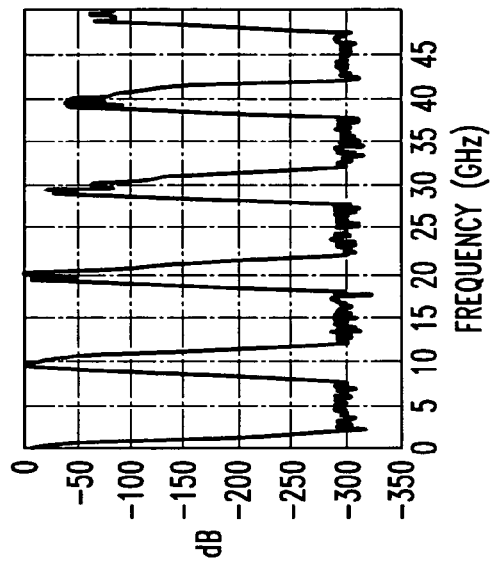
Figure 5D:
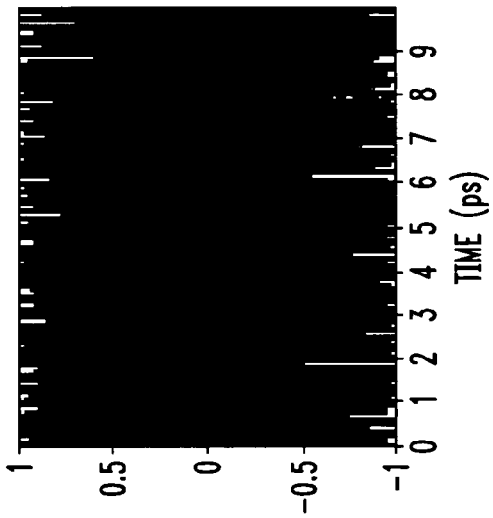
Figure 5E:
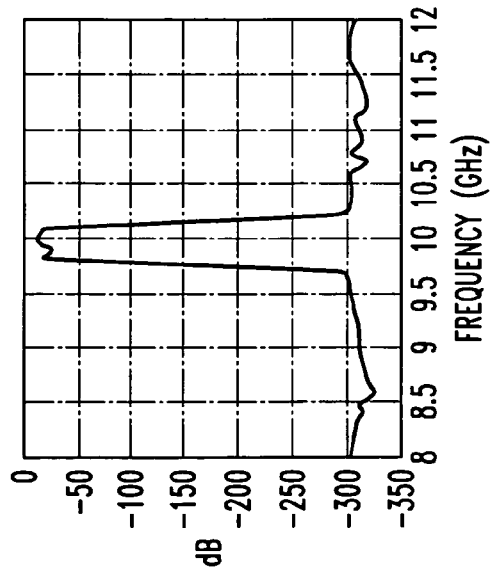
Figure 5F:
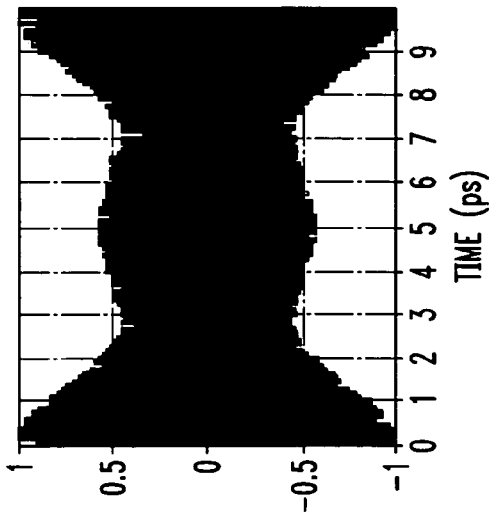

Turning now to FIGS. 5A-5F, illustrated is a simulation of the MDPD process for an arbitrary signal centered at 10 GHz with an instantaneous bandwidth of 500 MHz. For purposes of the simulation, the frequency difference $\Delta\omega$ between transmit and local oscillator lasers is set to be 9.5 GHz, while the sampling rate after the low-pass filtering is only 5 gigasamples/second. The frequency- and time-domain representations of the signal is shown in FIGS. 5A and 5B, respectively. FIGS. 5C and 5D respectively show the signal after the photodetection in the frequency and time domains. FIGS. 5E and 5F respectively show the fully recovered signal after the MDPD process in the frequency and time domains. This simulation assumes a perfect signal pass. One advantage of the MDPD process is that deterministic imperfection of the transmission channel can be eliminated by adjusting the phase modulation model.

Figure 6:
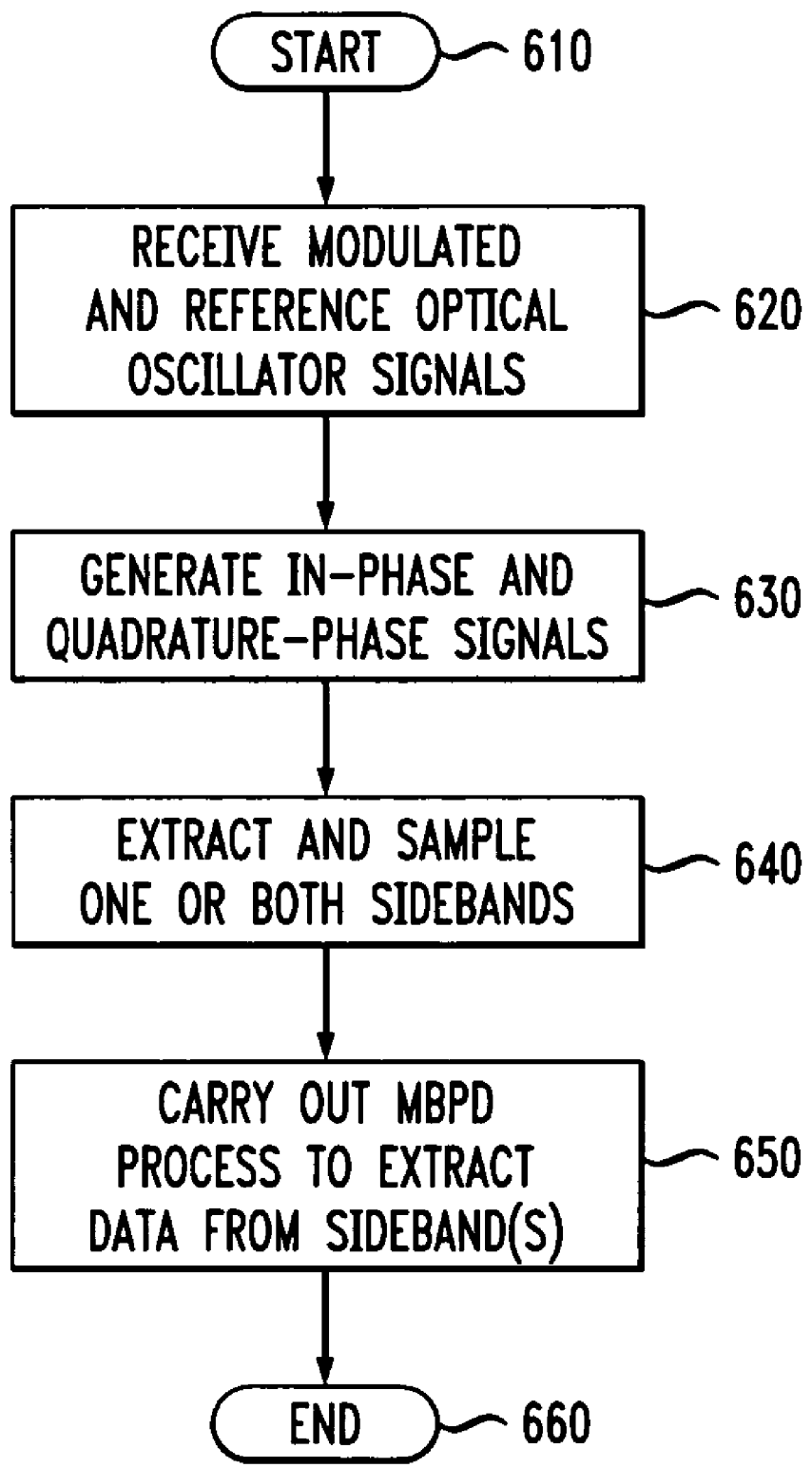
FIG. 6 illustrates a flow diagram of one embodiment of a method of receiving optical signals carried out according to the principles of the present invention.

Turning now to FIG. 6, illustrated is a flow diagram of one embodiment of a method of receiving optical signals carried out, e.g., according to the principles of the optical heterodyne receiver 100 of FIGS. 1 and 2. The method begins in a start step 610, wherein it is desired to receive and extract data from a PM optical signal.

In a step 620, a modulated optical signal and a reference optical oscillator signal are received at first and second optical inputs, respectively, of a quadrature photonic demodulator. In a step 630, an in-phase signal and a quadrature-phase signal are generated at first and second electrical outputs, respectively, of the quadrature photonic demodulator, e.g., the demodulator 110 of FIG. 1, in response to receiving the modulated optical signal the reference optical oscillator signal. In a step 640, at least one sideband is extracted from the in-phase signal or the quadrature-phase signal, e.g., by the passive RF SSB 120. In the embodiments illustrated above, a USB is extracted from the in-phase signal and an LSB is extracted from the quadrature-phase signal. Assuming two sidebands are extracted, they are then sampled by first and second sigma-delta analog-to-digital converters, respectively, which are coupled to the passive radio frequency single sideband demodulator, e.g., the ADC converters 231, 232 of FIG. 2. In a step 650, an MBPD process is carried out, e.g., in the DSP 233 of FIG. 2, to extract data from one or both sidebands of the in-phase signal or the quadrature-phase signal. In one embodiment, the MBPD process involves several steps as described above. In particular, the MBPD process uses information in only the lowest sidebands of the digitized signal to demodulate the data therefrom. The method ends in an end step 660, the data having been extracted.

Although the present invention has been described in detail, those skilled in the art should understand that they can make various changes, substitutions and alterations herein without departing from the spirit and scope of the invention in its broadest form.

What is claimed is:

1. An optical heterodyne receiver, comprising:
   an optical demodulator having first and second optical inputs and first and second electrical outputs and configured to generate at said first and second electrical outputs an in-phase signal and a quadrature-phase signal, respectively, in response to receiving a modulated optical signal at said first optical input and a reference optical oscillator signal at said second optical input;
   an electrical demodulator coupled to said optical demodulator and configured to extract a single upper sideband and a single lower sideband of said in-phase signal or said quadrature-phase signal and configured to produce a control signal fed back to said optical demodulator; and
   at least one first analog-to-digital converter coupled to said electrical demodulator and configured to receive and sample said extracted single upper sideband and at least one second analog-to-digital converter coupled to said electrical demodulator and configured to receive and sample said extracted single lower sideband.

2. The optical heterodyne receiver as recited in claim 1 wherein said at least one first and second analog-to-digital converter is a sigma-delta analog-to-digital converter.

3. The optical heterodyne receiver as recited in claim 1 further comprising a phase-locked loop coupled to said optical demodulator and configured to set a frequency of a reference optical oscillator that is configured to generate said reference optical oscillator signal.

4. The optical heterodyne receiver as recited in claim 1 further comprising a digital signal processor coupled to said first and second analog-to-digital converters and configured to execute a phase demodulation process with respect to said extracted single upper and lower sidebands.

5. The optical hetero dyne receiver as recited in claim 4 wherein said phase demodulation process includes representing a targeted signal in an orthogonal basis and calculating expected digitized data samples for signal elements in said targeted signal.

6. The optical heterodyne receiver as recited in claim 5 wherein said phase demodulation process further includes evaluating values of a cost function from a group of digitized data samples.

7. The optical heterodyne receiver as recited in claim 6 wherein said phase demodulation process further includes minimizing said cost function.

8. A method of extracting data from a phase-modulated input optical signal, comprising:
   generating at first and second electrical outputs of an optical demodulator having first and second optical inputs an in-phase signal and a quadrature-phase signal, respectively, in response to receiving said phase-modulated input optical signal at said first optical input and a reference optical oscillator signal at said second optical input;
   separating out a single upper sideband and a single lower sideband of said in-phase signal or said quadrature-phase signal with an electrical demodulator;
   providing a control signal from said electrical demodulator to said optical demodulator; and
   receiving and sampling said separated single upper sideband with at least one first analog-to-digital converter and said separated single lower sideband with at least one second analog-to-digital converter.

9. The method as recited in claim 8 wherein said at least one first and second analog-to-digital converter is a sigma-delta analog-to-digital converter.

10. The method as recited in claim 8 further comprising employing a phase-locked loop to generate said reference optical oscillator signal.

11. The method as recited in claim 8 further comprising executing a phase demodulation process with respect to separated upper and lower sidebands.

12. The method as recited in claim 11 wherein said phase demodulation process includes representing a targeted signal in an orthogonal basis and calculating expected digitized data samples signal elements in said targeted signal.

13. The method as recited in claim 12 wherein said phase demodulation process further includes evaluating values of a cost function from a group of digitized data samples.

14. The method as recited in claim 13 wherein said phase demodulation process further includes minimizing said cost function.

15. An optical heterodyne receiver, comprising:
   an optical demodulator having first and second optical inputs and first and second electrical outputs and configured to generate at said first and second electrical outputs an in-phase signal and a quadrature-phase signal, respectively, in response to receiving a modulated optical signal at said first optical input and a reference optical oscillator signal at said second optical input;
   an electrical demodulator coupled to said optical demodulator, configured to extract a single upper sideband and a single lower sideband of said in-phase signal and a quadrature-phase signal, respectively and configured to produce a control signal fed back to said optical demodulator; and
   a base band processor coupled to said electrical demodulator, containing first and second sigma-delta analog-to-digital converters configured to receive and sample said single extracted upper and lower sidebands, and configured to execute a phase demodulation process with respect to said extracted single upper and lower sidebands.

16. The optical hetero dyne receiver as recited in claim 15 further comprising a phase-locked loop coupled to said optical demodulator and configured to set a frequency of a reference optical oscillator that is configured to generate said reference optical oscillator signal.

17. The optical heterodyne receiver as recited in claim 15 wherein said phase demodulation process includes representing a targeted signal in an orthogonal basis and calculating expected digitized data samples for signal elements in said targeted signal.

18. The optical hetero dyne receiver as recited in claim 17 wherein said phase demodulation process further includes evaluating values of a cost function from a group of digitized data samples.

19. The optical heterodyne receiver as recited in claim 18 wherein said cost function is of the form $$e = \sum_n (\hat{z}_n - z_n)^2.$$

20. The optical heterodyne receiver as recited in claim 18 wherein said phase modulation process further includes minimizing said cost function.

* * * * *

UNITED STATES PATENT AND TRADEMARK OFFICE
CERTIFICATE OF CORRECTION

PATENT NO. : 7,650,084 B2 Page 1 of 1
APPLICATION NO. : 11/236246
DATED : January 19, 2010
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 907 days.

Signed and Sealed this

Twenty-eighth Day of December, 2010

David J. Kappos
*Director of the United States Patent and Trademark Office*